United States Patent [19]

Nemoto et al.

[11] Patent Number: 5,058,459
[45] Date of Patent: Oct. 22, 1991

[54] TRANSMISSION ASSEMBLY FOR TRACTORS

[75] Inventors: Shusuke Nemoto, Yao; Yoshiyuki Kirihata, Itami; Keisaku Hikishima, Kobe, all of Japan

[73] Assignee: Kanzaki Kokyukoki Mfg., Ltd., Inadera, Japan

[21] Appl. No.: 690,812

[22] Filed: Apr. 23, 1991

[30] Foreign Application Priority Data

Feb. 5, 1990 [JP] Japan ................ 2-47089[U]

[51] Int. Cl.⁵ .................... F16H 3/02; F16H 57/02
[52] U.S. Cl. ......................... 74/745; 74/606 R
[58] Field of Search ................ 74/745, 333, 606 R

[56] References Cited

U.S. PATENT DOCUMENTS

| | | | |
|---|---|---|---|
| 4,373,409 | 2/1983 | Benedek et al. | 74/745 |
| 4,485,692 | 12/1984 | Moore et al. | 74/745 |
| 4,602,519 | 7/1986 | Atkins et al. | 74/606 R X |
| 4,628,768 | 12/1986 | Omura et al. | 74/606 R X |
| 4,630,705 | 12/1986 | Kobayashi | 74/745 X |
| 4,716,775 | 1/1988 | Horii et al. | 74/745 X |
| 4,733,574 | 3/1988 | Uchiyama | 74/745 X |

FOREIGN PATENT DOCUMENTS

| | | |
|---|---|---|
| 58-22557 | 2/1983 | Japan. |
| 59-37131 | 3/1984 | Japan. |
| 63-39449 | 8/1988 | Japan. |

Primary Examiner—Dwight Diehl
Attorney, Agent, or Firm—Tilton, Fallon, Lungmus

[57] ABSTRACT

An auxiliary speed change mechanism (10) disposed within a rear portion of a tractor clutch housing (1) is supported by a support frame (11) comprising axially spaced front and rear bearing support plate members (11a, 11b) which are integrally connected by upper and lower connecting plate members (11c, 11d). The change mechanism includes two sets of constant-mesh gears (8, 9, 12, 13) and is operated by a shifter fork (17) which is supported by the support frame through a guide shaft (16). This structure facilitates an easy pre-assembling procedure of the change mechanism which is then installed into the tractor by securing the support frame to a front of a transmission casing (3) to be secured to the rear of the clutch housing. An integral, internal partition wall (1a) is provided in the clutch housing for interrupting lubricant oil for the change mechanism from a main clutch (2) which is disposed within a front end portion of the housing.

2 Claims, 6 Drawing Sheets

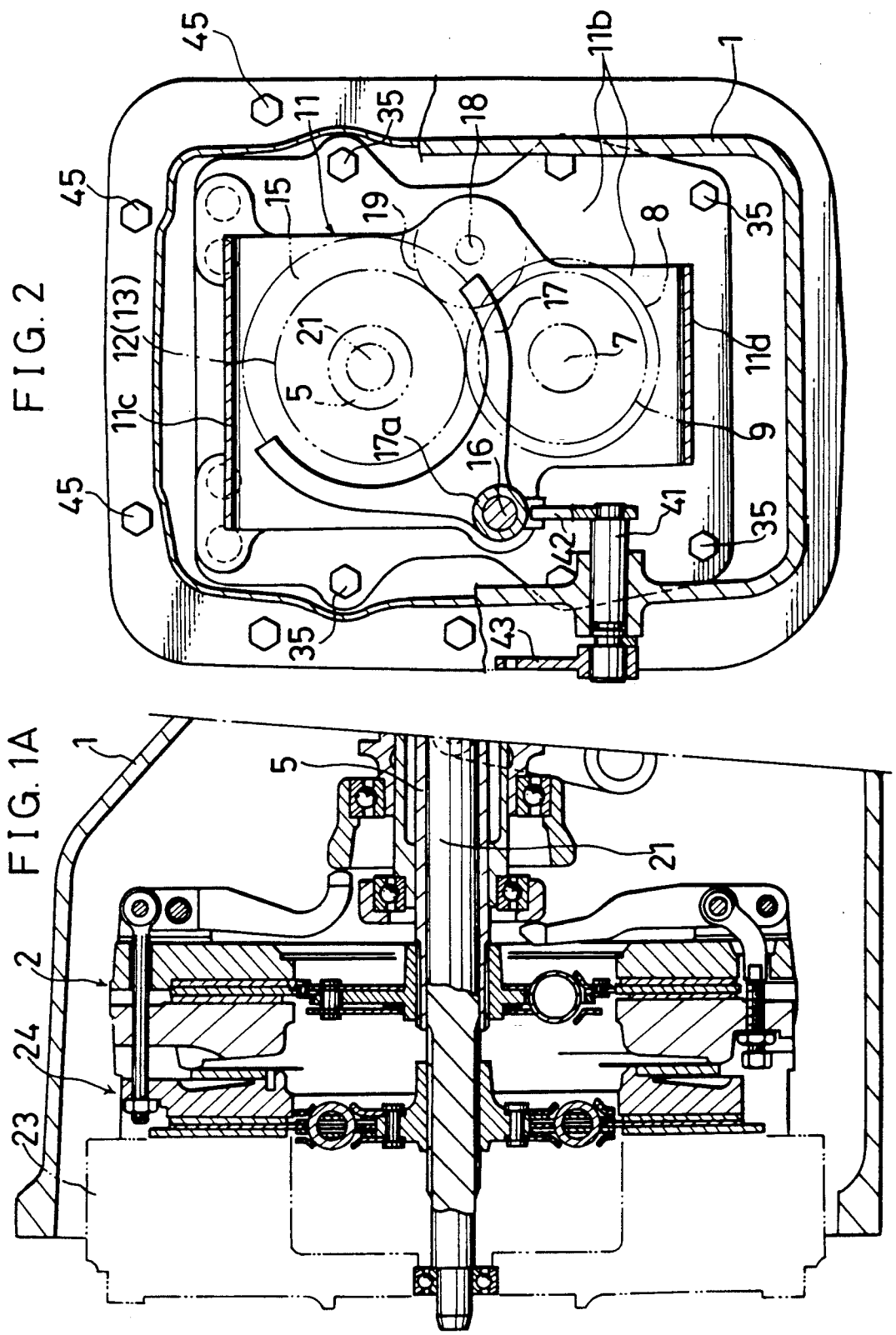

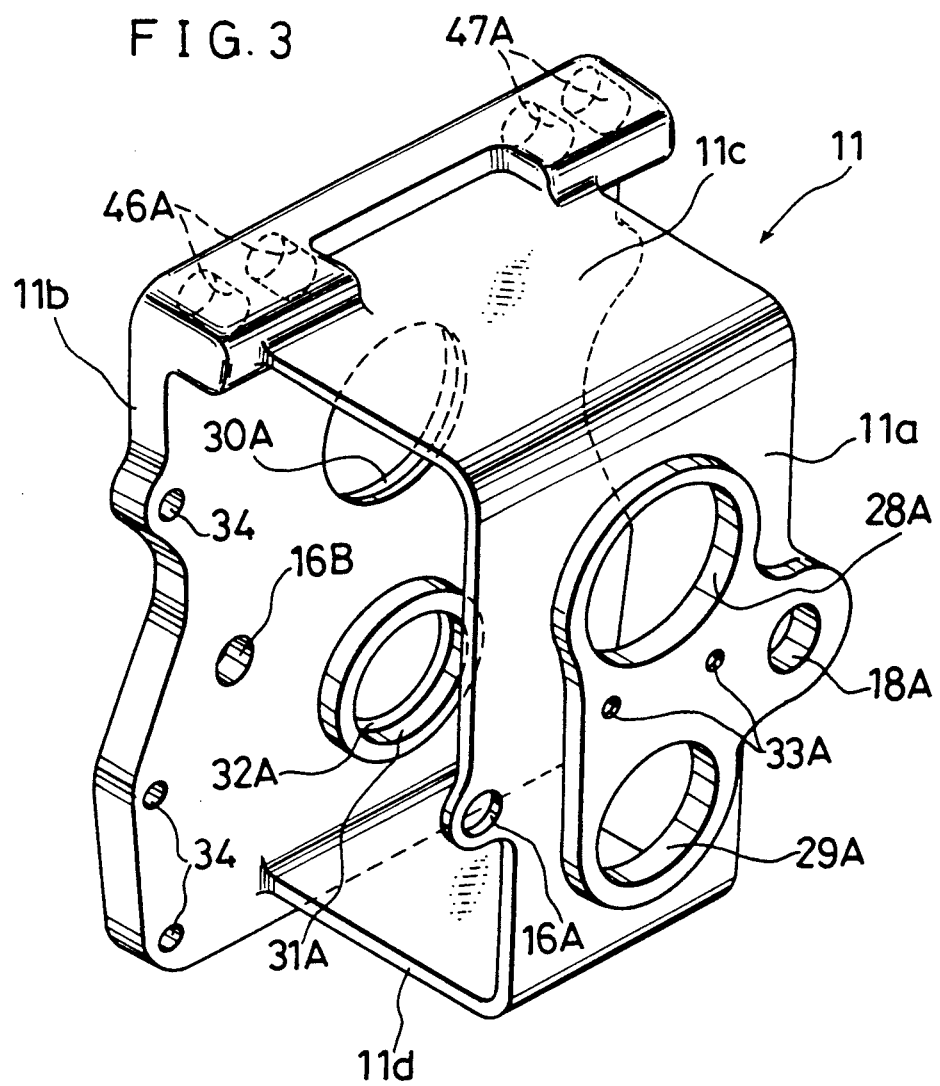

TRANSMISSION ASSEMBLY FOR TRACTORS

FIELD OF THE INVENTION

This invention relates to a transmission assembly for tractors in which an auxiliary speed change mechanism performing a two-stage speed change transmission is disposed within a clutch housing which forms a front part of the vehicle body of a tractor and includes at its front end portion a main clutch.

BACKGROUND OF THE INVENTION

When such auxiliary speed change mechanism is fashioned to a mechanical one in a tractor having a transmission casing which is fastened to the rear of a clutch housing and includes a main speed change mechanism, a transmission assembly including the auxiliary speed change mechanism is usually fashioned as shown, for example, in JP, U No. 58-22557 and JP,U No. 59-37131, such that an input shaft for the transmission casing is disposed co-axially with a drive shaft of the driven side of the main clutch, and such that a counter shaft which is connected drivingly to the input shaft is disposed parallel to the drive and input shafts within a rear portion of the clutch housing. And, the auxiliary speed change mechanism is fashioned such that it performs a two-stage speed change transmission between the drive shaft and the input shaft through the counter shaft. When the counter shaft is removed from this structure and the input shaft for the transmission casing is directly coupled to the co-axial drive shaft, a transmission assembly is provided which is adapted for use in tractors of a design having no auxiliary speed change mechanism within the clutch housing. It is thus seen that the structure set forth above permits an easy conversion of transmission assemblies between tractors of a design having an auxiliary speed change mechanism within a clutch housing and of another design including no auxiliary speed change mechanism and will contribute to economy.

Of the two publications set forth above, JP, U No. 58-22557 discloses a transmission assembly in which an auxiliary speed change mechanism is supported by a bearing support plate, which is secured onto a front surface of an internal partition wall of the clutch housing so as to cover a large opening in the partition wall, and by a rear wall of the clutch housing. In the transmission assembly disclosed in JP, U No. 59-37131, an auxiliary speed change mechanism is housed in an auxiliary gear box which is disposed within a rear portion of the clutch housing and is secured onto a front surface of the transmission casing.

The reason why an internal partition wall is provided in the clutch housing or a separate auxiliary gear box is provided for housing a auxiliary speed change mechanism, as described above, is that an auxiliary speed change mechanism requires lubrication thereof so that it is necessary to interrupt lubricant oil for the change mechanism from a dry-type main clutch which is disposed within a front end portion of the clutch housing.

In a case where a rear wall of the clutch housing is used as a support member for the rearer side of an auxiliary speed change mechanism, as is the case in the transmission assembly shown in JP, U No. 58-22557, the auxiliary speed change mechanism is to be assembled necessarily within the clutch housing so that assembling procedure of the change mechanism is very troublesome. Contrary to this, a separate auxiliary gear box such as shown in JP, U No. 59-37131 permits an easy assembling procedure because the separate gear box housing in it an auxiliary speed change mechanism may firstly be secured onto a front surface of the transmission casing and, then, the clutch housing may be secured to the front of transmission casing. On the other hand, the separate gear box will enlarge weight of a transmission assembly and also will require a tight sealing structure for preventing leakage of lubricant oil into the clutch housing.

In a case where a bearing support plate to be secured to an internal partition wall of the clutch housing is used as a support member for the fronter side of an auxiliary speed change mechanism, as shown in JP, U No. 58-22557, it is required, when the transmission assembly is converted into the one of a type having no auxiliary speed change mechanism within the clutch housing, that a large opening in the partition wall is to be covered using a bearing support plate of a different design or structure. Further, in a tractor including an auxiliary speed change mechanism of fluid clutch-operated type, which has a large axial width as compared to a mechanically operated one, as shown, for example, in JP, B2 No. 63-39449, the internal partition wall of clutch housing which is located in accordance with the axial width of a mechanically operated change mechanism must be replaced into a fronter location. This means that a clutch housing of an entirely different design is required.

In the structure shown in JP, U 59-37131, the clutch housing does not include an internal partition wall. It is, however, preferred to provide an internal partition wall for securing rigidity of a clutch housing with keeping a small thickness of outer walls of the housing, as is done in many tractors.

OBJECTS

Accordingly, a primary object of the present invention is to provide a novel and improved transmission assembly for tractors in which a mechanically operated auxiliary speed change mechanism is provided so that it may be small in weight and may be assembled with ease. An attendant object of the present invention is to provide a novel transmission assembly in which an internal partition wall is provided in a clutch housing so that the clutch housing may be adapted for use also in a tractor having no auxiliary speed change mechanism as well as in a tractor having a fluid clutch-operated auxiliary speed change mechanism.

BRIEF DESCRIPTION OF THE DRAWINGS

Other objects and advantages of the present invention will become readily apparent as the specification is considered in conjunction with the accompanying drawings in which:

FIGS. 1A and 1B are sectional side views of a part of a tractor in which a first preferred embodiment of the transmission assembly according to the present invention is employed;

FIG. 2 is a sectional view, partially omitted, taken generally along line II—II of FIG. 1B;

FIG. 3 is a perspective view of a support frame shown in FIGS. 1B and 2;.

SUMMARY OF THE INVENTION

Figure 1B:
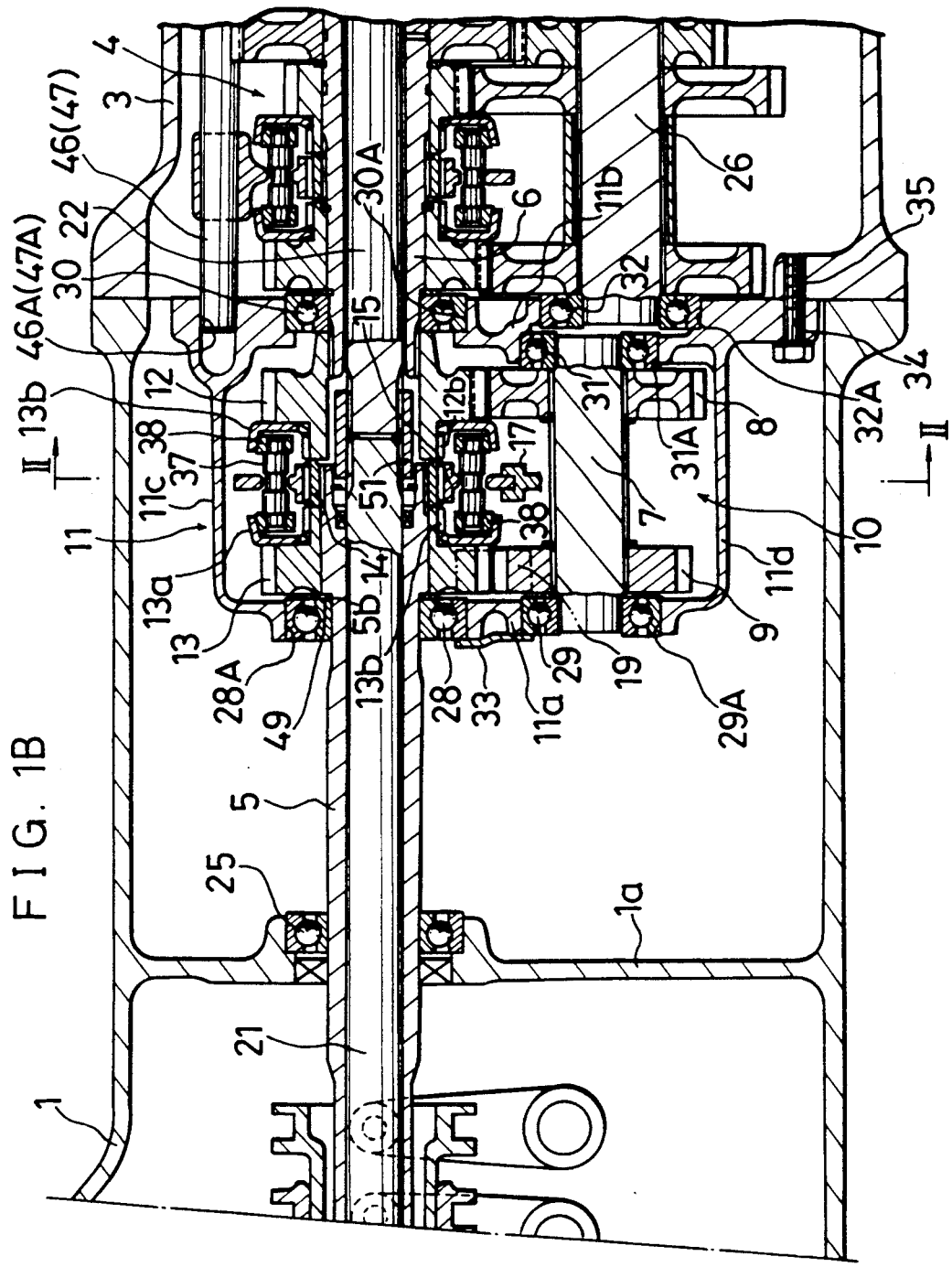

The present invention relates to a transmission assembly for tractors in which, as shown in the accompanying drawings, a clutch housing 1 and a transmission casing 2 are arranged in series in a longitudinal direction of a tractor and are fastened together. The clutch housing 1 includes in its front end portion a main clutch 2, and the transmission casing 3 includes in it a speed change mechanism 4. An input shaft 6 for the transmission casing 3 is disposed co-axially with a drive shaft 5 of the driven side of the main clutch 2. The transmission assembly further includes an auxiliary speed change mechanism 10 which is disposed within a rear portion of the clutch housing 1. The auxiliary speed change mechanism 10 includes a counter shaft 7, which is arranged parallel to the drive and input shafts 5 and 6, and a first set of axially spaced two gears 8 and 9, which are mounted on the counter shaft 7, and is operable to perform a two-stage speed-change transmission between the drive shaft 5 and the input shaft 6.

Figure 5:
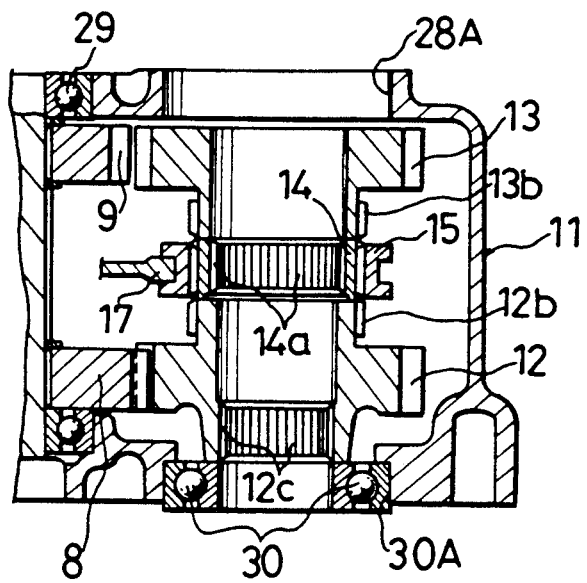
FIG. 5 is a sectional view of a part of a second embodiment of the transmission assembly according to the present invention, showing a state during a assembly procedure of an auxiliary speed change mechanism employed in this second embodiment.
Figure 6:
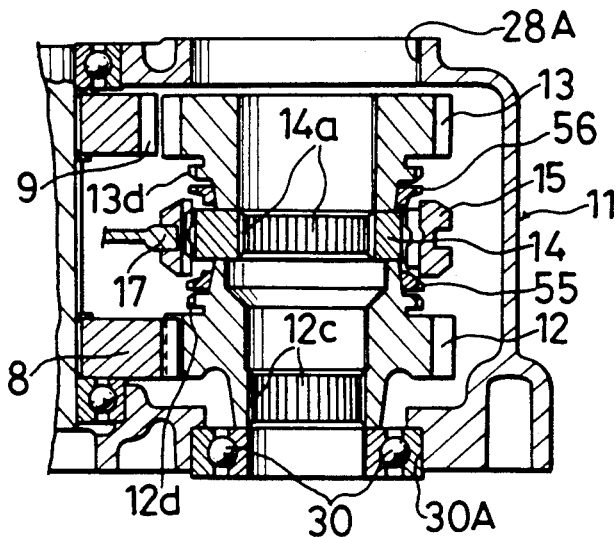
FIG. 6 is a sectional view similar to FIG. 5, but showing a third embodiment of the transmission assembly according to the present invention.
Figure 7:
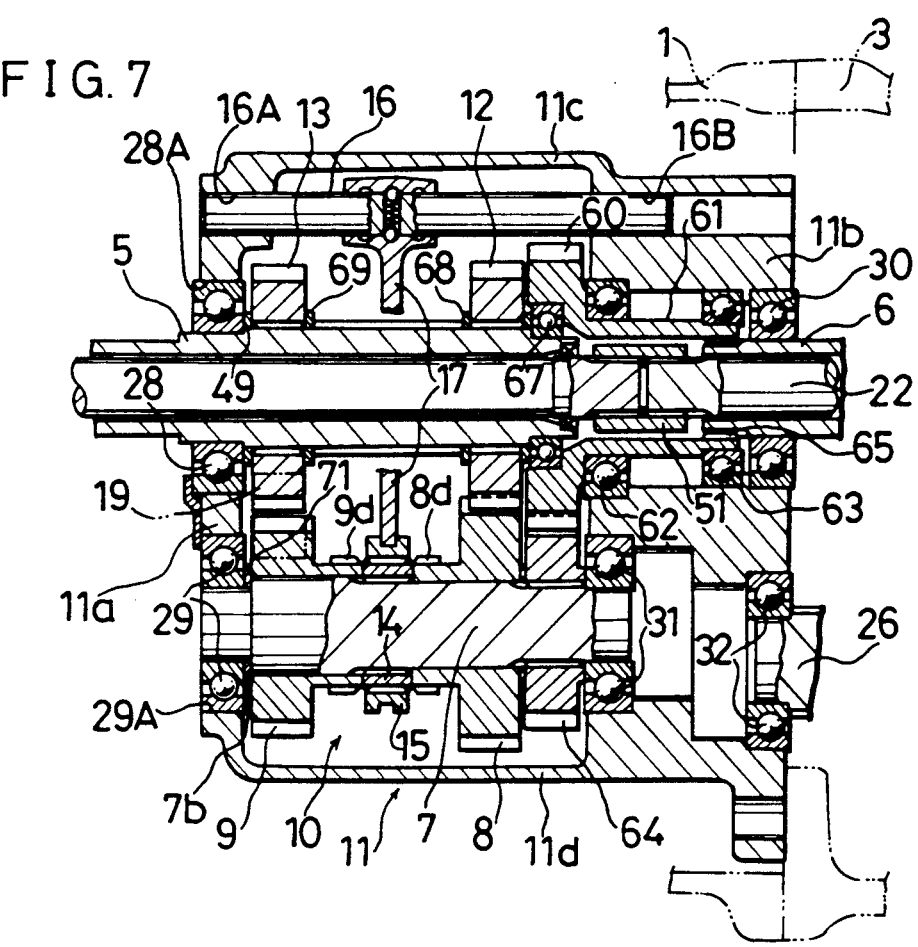
FIG. 7 is a sectional side view of a part of a fourth embodiment of the transmission assembly according to the present invention.
Figure 8:
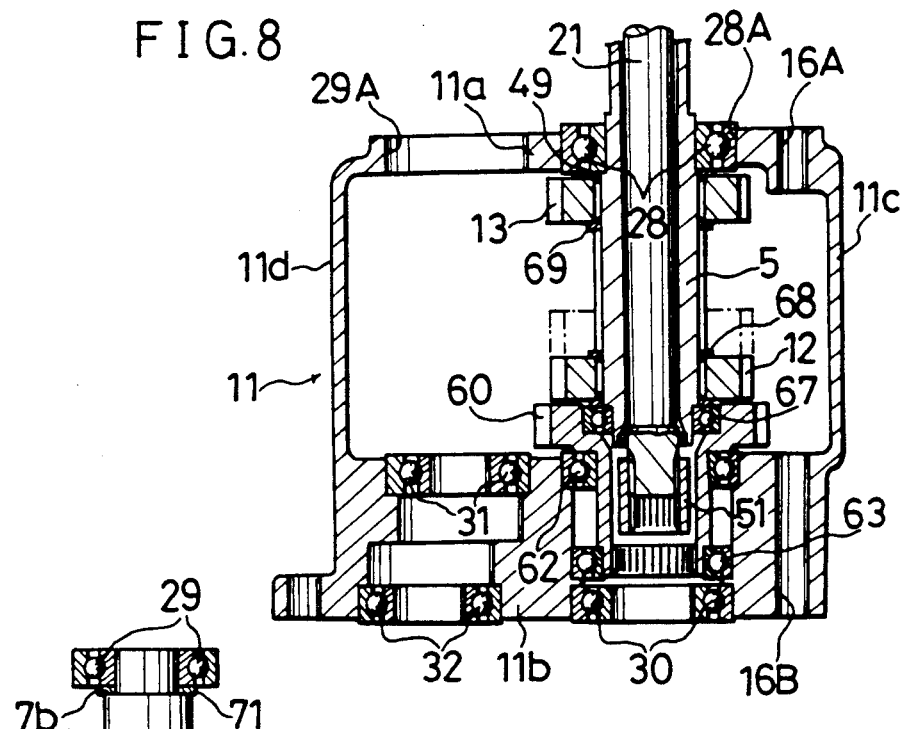
FIGS. 8 and 9 are sectional views, showing a way of assembling an auxiliary speed change mechanism shown in FIG. 7.
Figure 9:
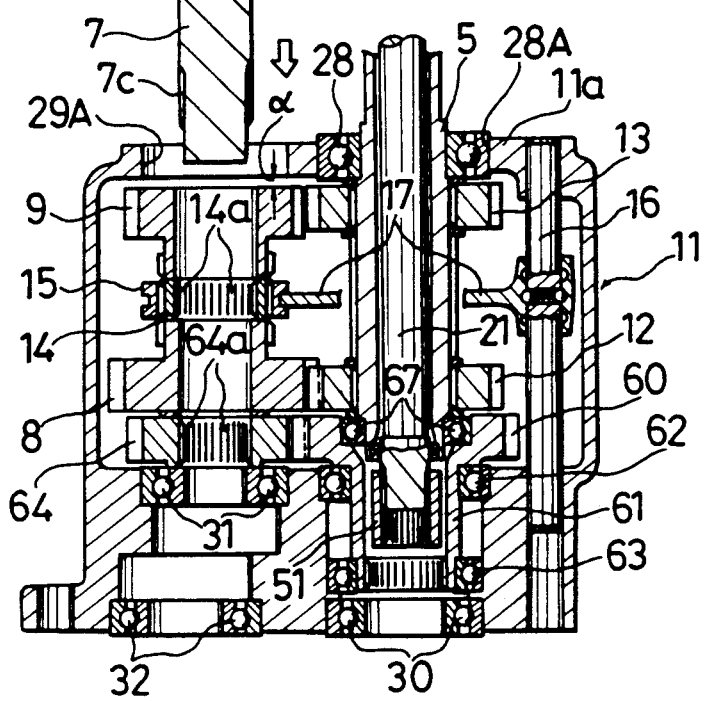

As shown in FIGS. 1 to 4, in FIG. 5, in FIG. 6, and in FIGS. 7 to 9, respectively, the transmission assembly according to the present invention includes a support frame 11 which is disposed within the rear portion of the clutch housing 1 for supporting the auxiliary speed change mechanism 10. This support frame 10 comprises axially spaced front and rear bearing support plate members 11a and 11b which are connected with each other by upper and lower connecting plate members 11c and 11d. The support frame 11 is secured at its rear bearing support plate member 11b onto a front of the transmission casing 3.

A second set of axially spaced two gears 12 and 13 are disposed co-axially with the drive and input shafts 5 and 6 and mesh respectively with the first set of two gears 8 and 9 so as to provide two gear trains of the auxiliary speed change mechanism 10.

A collar member 14 is disposed between one of the first and second sets of two gears and is fixedly mounted on one of the drive shaft 5 and the counter shaft 7 using a splined connection. A shifter sleeve 15 is slidably but non-rotatably mounted on the collar member 14 such that it is operable to couple the two gears of said one set 8, 9 or 12, 13 one at a time to the collar member 14.

According to the present invention, a guide shaft 16 extends between and is supported by the front and rear bearing plate members 11a and 11b of the support frame 11. A shifter fork 17 is slidably mounted on the guide shaft 16 for shifting the shifter sleeve 15.

An internal partition wall 1a which is integral with the clutch housing 1 is disposed in the clutch housing at a location before the auxiliary speed change mechanism 10.

The structure according to the present invention permits to pre-assemble the auxiliary speed change mechanism 10 which may then be mounted onto a front of the transmission casing 3. Then, the clutch housing 1 may be secured to the front of the transmisson casing 3. Pre-assembling procedure of the auxiliary speed change mechanism may be carried out with ease in a menner which will be detailed hereinafter.

Figure 4:
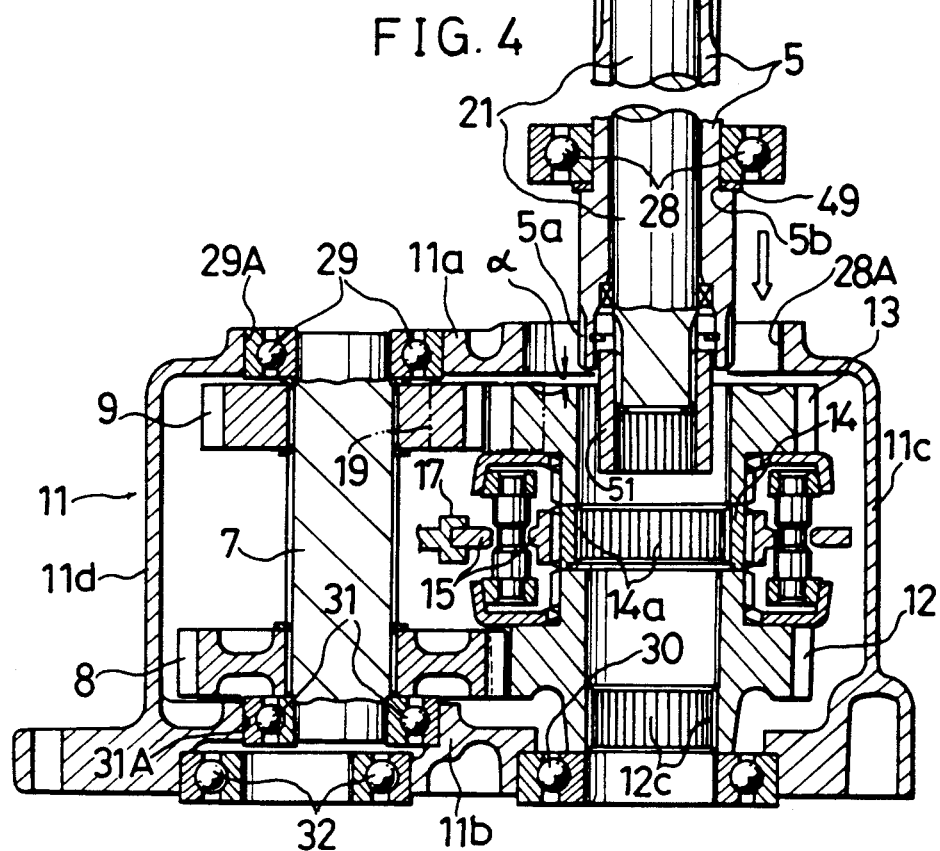
FIG 4 is a sectional view, showing a way of assembling an auxiliary speed change mechanism shown in FIG. 1B.

In the auxiliary speed change mechanism 10 shown in FIGS. 1B and 2, the collar member 14 is disposed between the second set of two gears 12 and 13 and is fixedly mounted on the drive shaft 5 using a splined connection. For assembling this change mechanism 10, the counter shaft 7 mounting the first set of two gears 8 and 9 is supported, as shown in FIG. 4, by the support frame 11 using the front and rear bearing support plate members 11a and 11b of this frame 11. The second set of two gears 12 and 13 and the collar member 14 therebetween are placed to their positions shown in FIG. 4 and gears 8 and 12 and gears 9 and 13 are respectively meshed together. In the case shown, gears 9 and 13 are meshed together through an idler gear 19. The guide shaft 16 mounting the shifter fork 17 is supported by the front and rear bearing support plate members 11a and 11b of the support frame 11, and the shifter fork 17 is engaged with the shifter sleeve 15 on the collar member 14. At this stage the gears 12 and 13 and collar member 14 are located in their respective required positions in a co-axial relationship owing to meshment between gears 8, 12 and 9, 13 and owing to the arrangement of collar member 14 between gears 12 and 13, and this condition is kept by the shifter fork 17 which supports the shifter sleeve 15 on the collar member 14. Consequently, the drive shaft 5 may be inserted from the side of front bearing support plate member 11a, as shown with an arrow in FIG. 4, into gears 12 and 13 and collar member 14 so that splines 5a in an outer surface of the drive shaft 5 are engaged with splines 14a in an inner circumference of the collar member 14 whereby the collar member 14 is spline-fitted, as reuired, on the drive shaft 5.

In the auxiliary speed change mechanism 10 shown in FIG. 7, the collar member 14 is disposed between the first set of two gears 8 and 9 and is fixedly mounted on the counter shaft 7 using a splined connection. For assembling this change mechanism 10, the drive shaft 5 and the second set of two gears 12 and 13 re firstly supported at their respective required positions, as shown in FIG. 8, by the support frame 11 using the front and rear bearing support plate members 11a and 11b of this frame 11. Then, as shown in FIG. 9, the gears 8 and 9 are meshed with gears 12 and 13, the collar member 14 is interposed between the gears 8 and 9, the guide shaft 16 mounting the shifter fork 17 is supported by the support frame 11 and the shifter fork 17 is engaged with the shifter sleeve 15 on the collar member 14. At this stage of the assembling procedure, the gears 8 and 9 and collar member 14 are kept in their respective required positions in a co-axial relationship by the shifter fork 17 which supports the shifter sleeve 15 on the collar member 14. Consequently, the counter shaft 7 may be inserted from the side of front bearing support plate member 11a of the support frame, as shown with an arrow in FIG. 9, into the gear 9, collar member 14 and gear 8 so that splines 7a in an outer surface of the counter shaft 7 are engaged with splines 14a in an inner circumference of the collar member 14 whereby the collar member is spline-fitted, as required, on the counter shaft 7.

A stable pre-assembly is obtained when the drive shaft 5 is assembled from the state shown in FIG. 4 into its required position or when the counter shaft 7 is assembled from the state shown in FIG. 9 into its required position Such pre-assembly may then be mounted onto a front of the transmission casing 3 by securing the rear bearing support plate member 11b of support frame 11 to the front of casing 3. The clutch housing 1 is then placed onto and secured to the front of the transmission casing 3, whereby a condition is attained where the auxiliary speed change mechanism 10 is assembled or disposed within a rear portion of the clutch housing 1. The input shaft 6 may be connected to an output end of the auxiliary speed change mechanism 10 simultaneously with the assembling procedure set forth above by arranging this shaft 6 so that it extends forwardly from the transmission casing 3.

As can be understood now, the mechanical, two-stage speed change mechanism 10 may be assembled and installed in a tractor with ease owing to the support frame 11, which is separate from the clutch housing 2 and comprises a pair of axially spaced front and rear bearing support plate members 11a and 11b which are connected integrally by means of upper and lower connecting plate members 11c and 11d, and owing to the structure that the shifter fork 17 for shifting the shifter sleeve 15 on the collar member 14, which is interposed between co-axial two gears 12, 13 or 8, 9 of two gear trains of constant-mesh type, is mounted on the guide shaft 16, which is supported by the support frame 11, so that the co-axial two gears 12, 13 or 8, 9 and collar member 14 may be kept in their predetermined, required positions prior to the insertion of drive shaft 5 or counter shaft 7. The support frame 11, which comprises front and rear bearing support plate members 11a and 11b connected together by the upper and lower connecting plate members 11c and 11d, includes at its both sides openings through which gears and the like may be inserted into a space between the front and rear bearing support plate members 11a and 11b without any difficulty. Such support frame 7 may, of course, be small in weight.

Although the support frame 7 includes open side ends, lubricant oil for the auxiliary speed change mechanism 10 is interrupted from the main clutch 2 of a dry-type by the internal partition wall 1a of clutch housing 1. Because this partition wall 1a is not used for supporting the auxiliary speed change mechanism 10, it may be located well before the auxiliary speed change mechanism with a substantial axial interval therebetween so that clutch housings of the same design may be employed not only in a tractor of a design including no auxiliary speed change mechanism but also in a tractor of another design including a fluid clutch-operated auxiliary speed change mechanism which has a large axial width as compared to a mechanically operated auxiliary speed change mechanism. This is very advantageous in economical aspects.

DESCRIPTION OF PREFERRED EMBODIMENTS

FIGS. 1A, 1B, 2 and 3 depict a first embodiment of the present invention, and FIG. 4 depicts an assembling procedure of the auxiliary speed change mechanism employed in the first embodiment.

As shown in FIGS. 1A and 1B, the drive shaft 5 and input shaft 6 referred to before are formed to hollow shafts through which a drive shaft 21 and transmission shaft 22 in a power take-off transmission path extend. The hollow drive shaft 5 is connected to an engine fly wheel 23 through the main clutch 2, whereas the drive shaft 21 is connected to the fly wheel 23 through a power take-off main clutch 24. The internal partition wall 1a referred to before is formed intergrally with the clutch housing 1 at a location substantially apart forwardly of the support frame 11 and supports a mid portion of the drive shaft 5 through a bearing 25. A transmission shaft 26 extending parallel to the input shaft 6 is disposed at a low level within the transmission casing 3. Transmission mechanism in the transmission casing 2 includes a speed change mechanism 4 disposed between the input shaft 6 and the transmission shaft 26.

As shown in FIGS. 1B, 2 and 3, the support frame 11 shown is fashioned such that the rear bearing support plate member 11b is larger in thickness and in lateral width than the front bearing support plate member 11a and such that the upper connecting plate member 11c is larger in lateral width than the lower connecting plate member 11d. The front bearing support plate member 11a includes in it upper and lower bearing-retaining bores 28A and 29B for bearings 28 and 29 which receive the drive shaft 5 and counter shaft 7, respectively. Similarly, the rear bearing support plate member 11b includes in it upper and lower bearing-retaining bores 30A and 31A for bearings 30 and 31 which receive the input shaft 6 and counter shaft 7, respectively. A front end portion of the transmission shaft 26 is supported also by the rear bearing support plate member 11b through a bearing 32 fittingly retained by a bearing-retaining bore 32A which is formed in the plate member 11b in an overlapped but eccentric relationship with the bearing-retaining bore 31A.

The auxiliary speed change mechanism 10 shown is fashioned to a two-stage change mechanism for providing two change-speed ratios one of which is a forward direction speed ratio and the other of which is a backward direction speed ratio. From this, the gears 13 and 9 are meshed together through an idler gear 19 so as to provide a backward direction gear train. The idler gear 19 is rotatably mounted on an idler shaft 18 shown in FIG. 2 which is in turn supported by the front bearing support plate member 11a through a retaining bore 18A which is formed, as shown in FIG. 3, in the plate member 11a at its one side portion and at a level between the levels of upper and lower bearing-retaining bores 28A and 29A. At an opposite side of this retaining bore 18A, the front and rear bearing support plate members 11a and 11b include co-axial retaining bores 16A and 16B for fittingly receiving the guide shaft 16, referred to before, at front and rear end portions of this shaft 16. Support structure for the guide shaft 16 is clearly seen from FIG. 7 which depicts a fourth embodiment of the present invention. The shaft 16 is fittingly received at its both ends in the retaining bores 16A and 16B and is unmovably retained by means of, for example, a pin (not shown) which extends laterally through the guide shaft and through any one of the support plate members 11a and 11b. As shown in FIG. 1B, the upper and lower bearings 28 and 29 retained by the front bearing support plate member 11a are prevented from getting-away by a retaining plate 33. As shown in FIG. 3, a pair of threaded bores 33A are formed in the front bearing support plate member 11a for attaching the retaining plate 33 to the plate member 11a at a front surface of this member. The rear bearing support plate member 11b includes at its side end portions thorough bores 34 through which bolts 35 extend into threaded bores (one of which is shown in FIG. 1B) formed in internal boss portions of the transmission casing 3 so as to secure the plate member 11b and, therefore, support frame 11 to the front of transmission casing 3.

In the first embodiment, the auxiliary speed change mechanism 10 includes a synchronizer clutch comprising synchronizer guide pins 37, which extends through the ring-shaped shifter sleeve 15, and synchronizer rings 38 which are held by the guide pins 37 and are operable to engage frictionally with synchronizing outer rings 12a and 13a which are co-rotatable with the gears 12 and 13. Gear 12 is rotatably mounted on the drive shaft 5, whereas gear 13 is fixedly mounted on the input shaft 6 using a splined connection. Each of these gears 12 and 13 includes splines 12b, 13b with which splines in an inner circumference of the shifter sleeve 15 are engaged when a synchronized rotation between each outer ring 12a, 13a and each synchronizer ring 38 has been attained. Gears 8 and 9 meshing respectively with the gears 12 and 13 are fixedly mounted on the counter shaft 7 using splined connections.

As shown in FIG. 2, the shift fork 17 is slidably mounted at its hollow cylindrical portion 17a on the guide shaft 16 and engages the shifter sleeve 15 such that the fork 17 embraces about a half of the periphery of sleeve 15 from a diagonally downward direction. A rotatable control arm 41 extends through a side wall of the clutch housing 1 and carries at its inner end an operating arm 42 which engages the shifter fork 17 such that when the control shaft 41 is rotationally displaced the fork 17 is slidingly moved along the guide shaft 16. A shifting arm 43 is attached to an outer end of the control shaft 41.

A plurality of bolts 45 shown in FIG. 2 are used for fastening the clutch housing 1 and transmission casing 3 together. Although not shown in the drawings, two sets of mechanically operated speed change mechanisms are disposed within the transmission casing 3 and are connected in series with each other. For operating these speed change mechanisms, two pairs of shifter fork-guiding shafts 46 and 47 (one of which is shown in FIG. 1B) are provided and are fixedly received at their front ends in retaining bores 46A and 47A which are formed in the rear bearing support plate member 11b, as shown in FIG. 3, at uppermost and side end portions of this plate member.

As shown in FIG. 1B, a ring 49 is interposed between the front bearing support plate member 11a and gear 13 for preventing a sliding engagement between the plate member 11a and gear 13 with certainty. This ring 49 is disposed on the drive shaft 5 and is held in position by being sandwiched between an annular shoulder 5b in the outer surface of drive shaft 5 and the bearing 28.

From this, in a condition shown in FIG. 4 where the ring 49 has not been set between the plate member 11a and gear 13, there is a clearance α corresponding to the thickness of ring 49 between these plate member and gear. For keeping gear 13 in the required position shown in FIG. 4, it is planned to carry out the assembling procedure shown in FIG. 4 in a posture of the support frame 11 where the front bearing support plate member 11a is in upside. The ring 49 is previously assembled between the annular shoulder 5b and bearing 28 on the drive shaft 5, and the drive shaft is inserted from an upward direction into the support frame 11. When the drive shaft 5 has been assembled so as to fit the bearing 28 into the bearing-retaining bore 28A, the clearance α is filled with the ring 49.

As shown in FIG. 1B, the drive shaft 21 and transmission shaft 22 in the power take-off path are coupled together by means of a coupling sleeve 51. In the assembling procedure shown in FIG. 4, the drive shaft 22 is previously passed through the hollow drive shaft 5 and is previously equipped at its lower end with the coupling sleeve 51. And then, this shaft 22 is insertingly assembled together with the drive shaft 5.

After the drive shafts 5 and 21 have been assembled from the state shown in FIG. 4, the retaining plate 33 shown in FIG. 1B is attached to the front bearing support plate member 11a so as to prevent bearings 28 and 29 from getting-away. The support frame 11 is then put into its horizontal posture and is placed onto the front surface of transmission casing 3 from which the input shaft 6 and transmission shaft 22 extend forwardly. By this, splines 12c formed in an inner circumference of the gear 12 is engaged with splines formed in the outer surface of a front end portion of the input shaft 6 so that the gear 12 is spline-fitted on the input shaft 6. At the same time, the drive shaft 21 and transmission shaft 22 for the power take-off line are coupled together through the coupling sleeve 51. At this time, the support frame 11 is secured to the transmission casing using bolts 35 shown in FIGS. 1B and 2.

Then, the clutch housing 1 is placed onto the front of the transmission casing 3 and is fastened to this casing using bolts 45 shown in FIG. 2. Thereafter, the main clutches 2 and 24 shown in FIG. 1A are assembled together with operating means for them into a front end portion within the clutch housing 1.

In use, when the shifter sleeve 15 of the auxiliary speed change mechanism 10 is operated so as to couple the gear 12 to the drive shaft 5 through the collar member 14, the input shaft 6 is driven to rotate toward a direction of travelling the vehicle forwardly. When the shifter sleeve 10 is shifted to a position where it couples the gear 13 to the drive shaft 5 through the collar member 14, the input shaft 6 is driven to rotate through the gear 13, idler gear 19, gear 9, counter shaft 7, and gears 8 and 12 toward a direction of travelling the vehicle backwardly.

FIG. 5 and FIG. 6 depict respectively a part of a third embodiment and fourth embodiment of the present invention in a condition before assembling the drive shaft 5 and also a drive shaft 21 in a power take-off path and in a posture of the support frame 11 where the front bearing support plate member 11a is in upside.

In the second embodiment shown in FIG. 5, the auxiliary speed change mechanism does not include a synchronizer clutch. Instead, a structure is employed in which splines in an inner, circumference of the shifter sleeve 15 are engaged forcedly by a shifting movement of the sleeve with splines 12b, 13b in the outer surface of a boss portion of each gear 12, 13.

In the third embodiment shown in FIG. 6, a synchronizer clutch of Borg Warner-type is employed Each gear 12, 13 includes at its boss portion a conical clutch surface on which a synchronizer ring 55, 56 having an internal conical clutch surface is mounted. Each gear 12, 13 further includes at its boss portion an integral splined ring 12d, 13d with which splines in an inner circumference of each synchronizer ring 55, 56 are engaged when a synchronized rotation has been attained by the synchronizer ring.

The other parts of each of the third and fourth embodiments are substantially same as the corresponding parts of the first embodiment. Each of these third and fourth embodiments may be assembled in a manner similar to that having been detailed with respect to the first embodiment.

FIG. 7 depicts a fourth embodiment of the present invention in which a hollow intermediate shaft 61 having at its front end an integral gear 60 is disposed between the drive shaft 5 and input shaft 6 and is rotatably supported by the rear bearing support plate member 11b of support frame 11 through a pair of axially spaced bearings 62 and 63. An additional gear 64 is fixedly mounted on the counter shaft 7 and meshes with the gear 60 on the intermediate shaft 61. The intermediate shaft 61 and input shaft 6 are coupled together using a splined connection 65.

In this fourth embodiment, the drive shaft 5 extends largely into the support frame 7 and is supported at its rear end portion by the hollow intermediate shaft 61 through a bearing 67. Gears 12 and 13 are fixedly mounted on this drive shaft 5 with an axial interval therebetween. These gears 12 and 13 are prevented from an axial displacement by means of snap rings 68 and 69 on the drive shaft. Gears 8 and 9 are rotatably mounted on the counter shaft 7, and the gear 8 meshes directly with gear 12 whereas the gear 9 meshes with gear 13 through an idler gear 19. Collar member 14 is interposed between the gears 8 and 9 and is spline-fitted onto the counter shaft 7. The shifter sleeve 15 is slidably but non-rotatably mounted on the collar member 14. Splines in the inner circumference of the shifter sleeve 15 are adapted to be engaged selectively with splines 8d and 9d in the outer surface of boss portions of the gears 8 and 9 so as to couple these gears one at a time to the counter shaft 7. Guide shaft 16 and shifter fork 17 are provided in the manner set forth before.

FIGS. 8 and 9 depict an assembling method of the auxiliary speed change mechanism 10 employed in the fourth embodiment as a pre-assembly.

For assembling the auxiliary speed change mechanism to a state shown in FIG. 8, the intermediate shaft 61 having gear 60 is firstly supported by the rear bearing support plate member 11b of support frame 11 through the pair of bearings 62 and 63. Then, in the posture shown of the support frame11, gear 12 is placed at its required position and gear 13 is placed on the gear 12 in a co-axial relationship with gear 12, as shown in phantom in FIG. 8. And then, the hollow drive shaft 5 and the drive shaft 21 of power take-off line are inserted together from the upward side into the support frame 11 to their assembled positions shown. At this time, the gear 13 is lifted along the drive shaft 5 to the required position shown and is retained in this position by attaching a C-shaped snap ring 69 onto the drive shaft 5. Position of the gear 12 is then fixed by attaching a C-shaped snap ring 68 onto the drive shaft 5. In addition, the counter shaft 7 employed in the first embodiment may be assembled in the manner set forth above.

The assembling procedure of counter shaft 7 shown in FIG. 9 is carried out in the manner described before. A ring 71 similar to the aforementioned ring 49 is used for preventing a sliding engagement between the front bearing support plate member 11a and the gear 9. This ring 71 is to be held in position on the counter shaft 7 by being sandwiched between an annular shoulder 7b in the outer surface of counter shaft 7 and the bearing 29 so that, in the state shown in FIG. 9, there is a clearance α between the plate member 11a and gear 9. For this, the counter shaft 7 is assembled in a posture of the support frame 11 where the front bearing support plate member 11a is in upside so as to keep the gear 9 in the position shown in FIG. 9. In the outer surface of counter shaft 7, additional splines 7c are formed which are engaged with internal splines 64a of the output gear 64 for fixedly mounting this gear on the counter shaft 7.

A pre-assembly which has been accomplished by the insertion of counter shaft 7 is assembled into a tractor in the manner described before.

In use of the fourth embodiment, when the shifter sleeve 15 is shifted to a position where the gear 8 is coupled to the counter shaft 7, the intermediate shaft 61 and input shaft 6 are driven to rotate toward a direction of travelling the vehicle forwardly. When the shifter sleeve 15 is shifted to another position where the gear 9 is coupled to the counter shaft 7, the input shaft 6 is driven to rotate toward another direction of travelling the vehicle backwardly.

In each of the embodiments having been detailed hereinbefore, the auxiliary speed change mechanism 10 is fashioned to a two-stage change mechanism of the type having a forward direction change ratio and a backward direction change ratio. However, such auxiliary speed change mechanism may also fashioned to a two-stage change mechanism of the type having a higher speed ratio and a lower speed ratio.

In addition, it is also possible to take an assembling precedure that a pre-assembly shown in FIG. 4 in which the drive shaft 5 has not been assembled yet is secured previously onto the front of transmission casing 3. This is because the collar member 14 in such pre-assembly is kept in its required position by the shifter fork 17, which receives shifter sleeve 15 on the collar member in the fashion shown in FIG. 2, so that gear 12 meshing with the gear 8 is also kept in the position shown in FIG. 4. Gear 13 meshing with the gear 9 through the idler gear 19 is axially movable within the clearance α shown, but this clearance is very small so that the posture itself of the gear 13 is not disturbed even when this gear 13 moves axially within the clearance α. Consequently, no problem is caused for inserting or assembling the drive shaft 5 into the support frame 7 which has already been secured to the front of transmission casing 3. And, when the drive shaft 5 is assembled singly or together with the clutch housing 1, the gear 13 is properly positioned by being pushed by the ring 49.

We claim:

1. In a transmission assembly for tractors, in which a clutch housing (1) and a transmission casing (3) are arranged in series in a longitudinal direction of a tractor and are fastened together, said clutch housing including in its front end portion a main clutch (2) and said transmission casing including in it a speed change mechanism (4); in which an input shaft (6) for said transmission casing is disposed co-axially with a drive shaft (5) of the driven side of said main clutch; and in which an auxiliary speed change mechanism (10) is disposed within a rear portion of said clutch housing, said auxiliary speed-change mechanism including a counter shaft (7), arranged parallel to said drive and input shafts, and a first set of axially spaced two gears (8, 9) mounted on said counter shaft and being operable to perform a two-stage speed change transmission between said drive shaft and said input shaft, the improvement comprising:

a support frame (11) disposed within said rear portion of said clutch housing (1) for supporting said auxiliary speed-change mechanism (10), said support frame comprising axially spaced front and rear bearing support plate members (11a, 11b), which are connected with each other by upper and lower connecting plate members (11c, 11d), and being secured at said rear bearing support plate member onto a front of said transmission casing (3);

a second set of axially spaced two gears (12, 13) disposed co-axially with said drive and input shafts (5, 6), said second set of two gears meshing respectively with said first set of two gears (8, 9) so as to provide two gear trains of said auxiliary speed-change mechanism (10);

a collar member (14) disposed between one of said first and second sets of two gears (8, 9; 12, 13) and being fixedly mounted on one of said drive shaft (5) and said counter shaft (7) using a splined connection;

a shifter sleeve (15) slidably but non-rotatably mounted on said collar member (14), said shifter sleeve being operable to couple said two gears (8, 9; 12, 13) of said one set one at a time to said collar member;

a guide shaft (16) extending between and supported by said front and rear bearing support plate members (11a, 11b);

a shifter fork (17) slidably mounted on said guide shaft (16) for shifting said shifter sleeve (15); and an internal partition wall (1a) disposed in said clutch housing (1) at a location before said auxiliary speed change mechanism (10), said partition wall being formed integral with said clutch housing.

2. A transmission assembly as set forth in claim 1, wherein said front and rear bearing support plate members (11a, 11b) and said connecting plate members (11c, 11d) are formed integrally such that said support frame (11) has side openings between said front and rear bearing support plate members and between said upper and lower connecting plate members.

* * * * *